J. J. McDONALD.
RAKER GAGE.
APPLICATION FILED DEC. 13, 1919.

1,366,575.

Patented Jan. 25, 1921.

INVENTOR
John J. McDonald
BY
ATTYS.

UNITED STATES PATENT OFFICE.

JOHN J. McDONALD, OF VANCOUVER, BRITISH COLUMBIA, CANADA.

RAKER-GAGE.

1,366,575.  Specification of Letters Patent.  Patented Jan. 25, 1921.

Application filed December 13, 1919. Serial No. 344,692.

*To all whom it may concern:*

Be it known that I, JOHN J. McDONALD, a citizen of the United States, and a resident of the city of Vancouver, in the Province of British Columbia, Canada, have invented certain new and useful Improvements in Raker-Gages, of which the following is a specification.

My invention relates to improvements in raker gages and the object of my invention is to provide a device for gaging the height of raker teeth whereby the rakers may be gaged by touch, thereby enabling the adjustment of the teeth to be effected with great nicety and accuracy, the means provided for this purpose being also adapted for insuring economy in the time occupied in filing the teeth when required.

I attain this object by the construction illustrated in the accompanying drawings in which—

Similar figures of reference indicate similar parts in the views.

Figure 2:
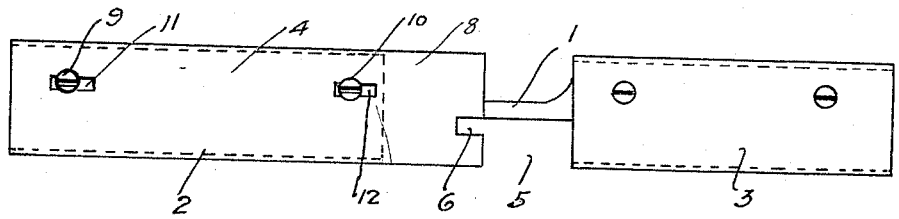
Fig. 2 is a plan view of Fig. 1.

1 indicates a gage frame of any approved pattern provided with bearing plates 2 and 3 forming a straight edge adapted to rest on the saw teeth when the device is in operation. Secured to the upper face of bearing plate 2 is a plate 4 the inner end of which projects into a gap 5 formed in the frame, which plate is slotted, as at 6 in Fig. 2, the width of the slot being such that the raker teeth, indicated by the dotted lines and the numeral 7, may project into or through it. The inner end of the plate 4 is inclined, as at 8, and the amount of inclination is such that an imaginery line drawn transversely across the upper face of the plate at the rear edge of the slot would coincide or be substantially in the same plane with the under side of the bearing plates and the incline is also the same as that of the raker teeth cutting face angle.

The plate 4 is secured to the frame by suitable screws 9 and 10, these passing through slots 11 and 12 in the plate so that it may be adjusted longitudinally when desired.

Figure 1:
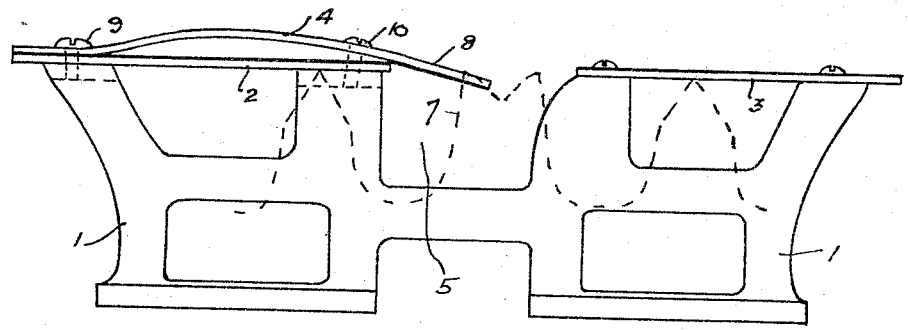
Figure 1 is a side view of a raker gage frame showing my invention embodied therewith.

The manner in which the device is used will be evident on reference being had to Fig. 1 as it will be seen that if the gage is set on the saw teeth so that the bearing plates rest on the same with a raker tooth lying in the slot 6 and the point of the raker projects above the surface of the plate 4, it will be felt by passing the thumb or finger over the plate and may be swaged until just flush with the plate and can no longer be indicated by the touch. Should the cutting face of the tooth project above the plate it may be brought to the true angle by passing the file over it until the face of the tooth and the inclined surface of the plate coincide.

From the foregoing it will be seen that I have devised a simple means for adjusting saw teeth by touch and with great accuracy.

What I claim as my invention is:—

1. A saw gage comprising a frame presenting a straight edge portion having an upper and a lower surface and a slot intermediate the length thereof, and a plate secured at one end to the upper surface of said straight edge at one side of said slot and having the opposite end thereof extended inwardly along the frame and inclined downwardly to project into said slot, the inner or free end of said plate being provided with a slot and being inclined at such an angle with respect to the straight edge that the upper surface of the plate at the rear edge of the slot lies in the plane defined by the lower surface of the straight edge.

2. A saw gage comprising a frame presenting two guide plates separated to provide an intervening slot and having the under surfaces thereof in the same plane to provide a straight edge, a gage plate supported upon the upper surface of one of said guide plates, said gage plate being adjustably secured to the guide plate and having one end thereof inclined downwardly into the slot between the guide plates and provided with a slot, the inclination of the plate being such that the upper surface of the plate at the rear edge of the slot is substantially in the same plane with the straight edge defined by the under surfaces of said guide plates.

Dated at Vancouver, B. C., this 27th day of November, 1919.

JOHN J. McDONALD.